United States Patent
Gong et al.

(10) Patent No.: US 11,821,874 B1
(45) Date of Patent: Nov. 21, 2023

(54) DYNAMIC LOAD SHEARING TEST DEVICE AND METHOD BASED ON HOPKINSON BAR SYSTEM

(71) Applicant: SHANDONG UNIVERSITY OF SCIENCE AND TECHNOLOGY, Qingdao (CN)

(72) Inventors: Xufei Gong, Qingdao (CN); Lexin Chen, Qingdao (CN); Yueying Zhang, Qingdao (CN); Weiyao Guo, Qingdao (CN); Chengguo Zhang, Qingdao (CN); Yulong Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/308,753

(22) Filed: Apr. 28, 2023

Related U.S. Application Data

(63) Continuation of application No. PCT/CN2022/104864, filed on Jul. 11, 2022.

(30) Foreign Application Priority Data

Jun. 16, 2022 (CN) .......................... 202210683159.2

(51) Int. Cl.
*G01N 3/04* (2006.01)
*G01N 3/24* (2006.01)

(52) U.S. Cl.
CPC .................. *G01N 3/04* (2013.01); *G01N 3/24* (2013.01); *G01N 2203/0025* (2013.01); *G01N 2203/0098* (2013.01); *G01N 2203/0226* (2013.01)

(58) Field of Classification Search
CPC .... G01N 35/00029; G01N 17/00; G01N 3/02; G01N 1/125; G01N 3/30; G01N 3/10; G01N 3/14; G03F 7/7085; G01M 13/00; G01M 1/04; G01M 13/04; G01M 7/022; G01M 17/0078; B41J 15/16; G01R 1/073;
(Continued)

(56) References Cited

U.S. PATENT DOCUMENTS 6,266,994 B1    7/2001  Albertini et al.

FOREIGN PATENT DOCUMENTS

| CN | 105571961 A | 5/2016 |
|----|-------------|--------|
| CN | 207066883 U | 3/2018 |

(Continued)

*Primary Examiner* — Brandi N Hopkins

(57) ABSTRACT

A dynamic load shearing test device and method based on a hopkinson bar system are provided in this disclosure, which relates to the technical field of rock detection tests. The device according to the disclosure includes a bearing frame, a carriage, a sample holding unit, a pressure environment generating unit, a sample switching unit, an incident bar and a transmission bar, and the test method includes following steps: test device assembly, device leveling, pre-test preparation, test conducting, sample angle switching and test device resetting. The disclosure has advantages that the cylindrical sample can be quickly fixed, a required temperature environment can be well maintained, the cylindrical sample can be better fixed in a high-pressure environment, rotation of the cylindrical sample is not hindered in a low-pressure environment, switching of test positions is facilitated, and test efficiency can be accelerated.

7 Claims, 6 Drawing Sheets

(58) Field of Classification Search
CPC ....... G01R 31/26; E06B 3/5045; G01D 11/30; C03B 33/03
See application file for complete search history.

(56) References Cited

FOREIGN PATENT DOCUMENTS

| | | | | |
|---|---|---|---|---|
| CN | 108918299 | A | | 11/2018 |
| CN | 110082222 | A | | 8/2019 |
| CN | 110987667 | A | | 4/2020 |
| CN | 111044391 | A * | 4/2020 | ............... G01N 3/02 |
| CN | 210293876 | U | | 4/2020 |
| CN | 114034541 | A | | 2/2022 |
| CN | 114577640 | A | | 6/2022 |
| CN | 114993858 | A * | 9/2022 | |
| WO | 2020186895 | A1 | | 9/2020 |

\* cited by examiner

DYNAMIC LOAD SHEARING TEST DEVICE AND METHOD BASED ON HOPKINSON BAR SYSTEM

CROSS-REFERENCE TO RELATED APPLICATIONS

This application is a continuation of International Application No. PCT/CN2022/104864 with a filling date of Jul. 11, 2022, designating the United states, now pending, and further claims to the benefit of priority from Chinese Application No. 202210683159.2 with a filing date of Jun. 16, 2022. The content of the aforementioned applications, including any intervening amendments thereto, are incorporated herein by reference.

TECHNICAL FIELD

The disclosure relates to the technical field of rock detection tests, in particular to a dynamic load shearing test device and method based on a hopkinson bar system.

BACKGROUND ART

Rock shearing test is generally used to measure rock strength and shear strength of rock mass. At present, working conditions of many rock engineering environment are complex, for example, when underground coal rocks are impacted by an underground pressure, researches on a rock structure and shear characteristics of a coal rock in this situation is insufficient at this stage, and laboratory tests are mostly conducted with a hopkinson pressure bar system.

At present, the test device based on the hopkinson bar system is not capable of single-sample comparison test, and many times of sampling tests should be conducted. Consequently, when assembling test samples, variables for test comparison cannot be accurately controlled. Meanwhile, a required temperature and pressure experimental environment in a test process needs to be repeatedly created, which increases costs of experimental time and resources. Additionally, the assembly process of the test samples is cumbersome, so the testers need to stay away from the test device during experiments in order to avoid danger.

SUMMARY

An object of the disclosure is to provide a dynamic load shearing test device and method based on a hopkinson bar system with a function of comparison test. The disclosure will solve several issues involved in traditional test devices, including lack of comparison test function, high costs of experimental time and resources demanded by repeatedly creating a required experimental environment, complexity of an assembly process, and potential danger involved in a test process.

In order to achieve the above object, technical schemes adopted by the disclosure are as follows.

A dynamic load shearing test device based on a hopkinson bar system includes a bearing frame. A carriage is provided at a left side of the bearing frame, a sample holding unit is provided on the carriage and the bearing frame, the sample holding unit is configured to position and fix a cylindrical sample, a pressure environment generating unit is provided in the sample holding unit, the sample holding unit and the pressure environment generating unit are configured to simulate an underground environment of a rock, and a sample switching unit is provided at a left part of the sample holding unit. The sample switching unit is configured to switch a shearing position of the cylindrical sample. An incident bar is provided at a left side of the sample holding unit, and a transmission bar is provided at a right side of the sample holding unit. Both the incident bar and the transmission bar belong to a split hopkinson bar dynamic test system, and there are two fixed frames. The carriage and the bearing frame are respectively fixedly connected with a fixed frame, and a threaded limit rod is provided between the two fixed frames in a throughgoing manner, and the right bearing frame is fixedly connected with two positioning rods.

The disclosure has following beneficial technical effects. With the dynamic load shearing test device and method based on the hopkinson bar system, rapid fixation of the cylindrical sample can be realized with convenient assembly of the fixed shell; limiting of the cylindrical sample in the left-right direction can be realized with the limit rotating plate and the limit baffle; a group of comparison tests on a single cylindrical sample can be realized by rotating the sample under the limiting of an extrusion rotating block of an extrusion block, with matching of the limit rotating plate and the spring limit rod; good maintenance of the experimental temperature environment can be realized with combined actions of the liquid pressure and the extrusion plate; better mounting of the cylindrical sample in a high pressure environment can be achieved with the extrusion plate of silicone materials, which also does not hinder rotation of the sample in a low pressure environment and facilitates switching of the test position; and operation efficiency of the test can be improved since the state of the test device can be quickly switched with combined applications of the threaded limit rod and the fixing frame.

Figure 1:
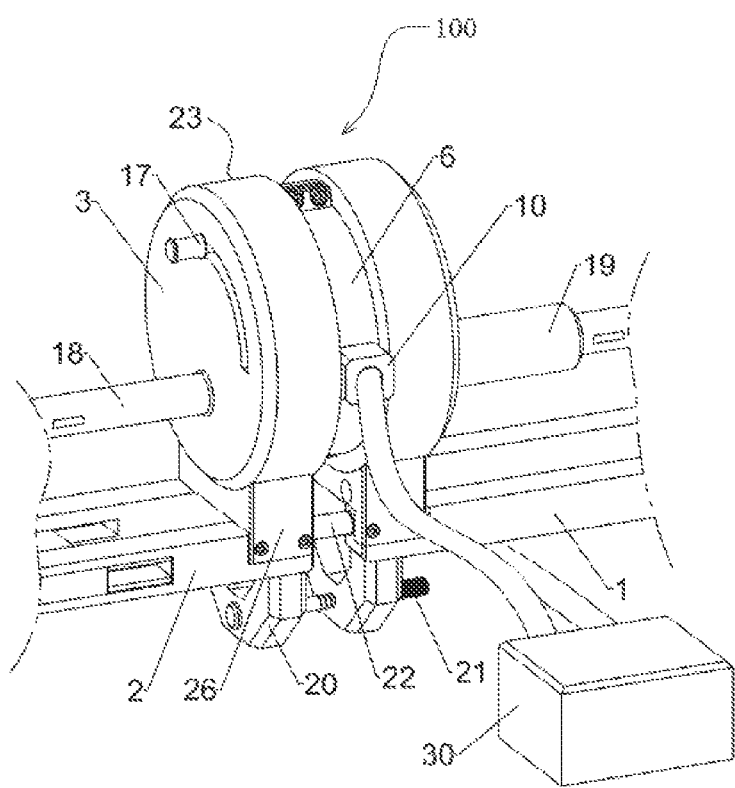
FIG. 1 is a schematic diagram of a three-dimensional structure according to the present disclosure.

Reference numbers are as follows: 100. Dynamic Load Shearing Test Device, 1. Bearing Frame, 2. Carriage, 3. Heating Frame, 31. Limit Hole, 32. Limit Chute, 4. Limit Rotating Plate, 41. First Positioning Hole, 42. Slot, 5. Limit Baffle, 51. Second Positioning Hole, 6. Fixed Shell, 7. Fixing Bolt, 8. Cylindrical Sample, 9. Rubber Pad, 10. Hydraulic Interface, 11. Extrusion Piston, 12. Extrusion Plate, 13. Extrusion Block, 14. Extrusion Rotating Block, 15. Extrusion Spring. 16. Spring Limit Block, 17. Spring Limit Rod, 18. Incident Bar, 19. Transmission Bar, 20. Fixed Frame, 21. Threaded Limit Rod, 22. Positioning Rod, 23. Sample Holding Unit, 24. Pressure Environment Generating Unit, 25. Sample switching unit, 26. Mounting Frame, 27.

Hydraulic Cavity. 28. Liquid in Hydraulic Cavity, 29. Unidirectional Rotating Assembly, 30. Hydraulic Loading Device.

DETAILED DESCRIPTION

The present disclosure will be described in further detail with reference to the drawings and specific embodiments.

Embodiment 1

A dynamic load shearing test device 100 based on a hopkinson bar system, as shown in FIGS. 1 to 6, includes a bearing frame 1. A carriage 2 is provided at a left side of the bearing frame 1, a sample holding unit 23 is provided on the carriage 2 and the bearing frame 1, the sample holding unit 23 is configured to position and fix a cylindrical sample 8, and the cylindrical sample 8 is quickly fixed by the sample holding unit 23, which facilitates operations of experimenters and saves test time. A pressure environment generating unit 24 is provided in the sample holding unit 23, the sample holding unit 23 and the pressure environment generating unit 24 are configured to simulate an underground environment of a rock so that real data and states of the cylindrical sample 8 is tested in a targeted manner. A sample switching unit 25 is provided at a left part of the sample holding unit 23. The sample switching unit 25 is configured to switch a shearing position of the cylindrical sample 8. An incident bar 18 is provided at a left side of the sample holding unit 23, and a transmission bar 19 is provided at a right side of the sample holding unit 23. Both the incident bar 18 and the transmission bar 19 belong to a split hopkinson bar dynamic test system, and there are two fixed frames 20. The carriage 2 and the bearing frame 1 are respectively fixedly connected with a fixed frame 20, and a threaded limit rod 21 is threaded fitted between the two fixed frames 20 in a throughgoing manner, and the right bearing frame 1 is welded with two positioning rods 22. The positioning rods 22 are configured to control a distance between the carriage 2 and the right bearing frame 1.

According to the disclosure, quick fixing of the cylindrical sample 8 can be facilitated with the sample holding unit 23, and the cylindrical sample 8 can be fixed in a left-right direction by the sample holding unit 23 by driving the left fixing frame 20 by the threaded limit rod 21, with cooperation of the positioning rod 22, and through the carriage 2, and then a test temperature and pressure of the cylindrical sample 8 are created through the sample holding unit 23 and the pressure environment generating unit 24. Then the incident bar 18 and the transmission bar 19 in the split hopkinson bar dynamic test system act on the cylindrical sample 8, the incident bar 18 transmits emission waves of the split hopkinson bar dynamic test system, the incident bar 18 receives reflection waves, and the transmission bar 19 receives respective transmission waves, and respective wave data are calculated and counted by the split hopkinson bar dynamic test system to obtain dynamic mechanical performance data of the cylindrical sample 8. Then, a test position of the cylindrical sample 8 is switched by the sample switching unit 25, so that more sets of comparison test data can be obtained through one cylindrical sample 8, and controlling of test environment variables can be easier, and it is not necessary to repeatedly heat the cylindrical sample 8. After the test is completed, the device of the disclosure can be reset after the cylindrical sample 8 is cooled.

Embodiment 2

Figure 2:
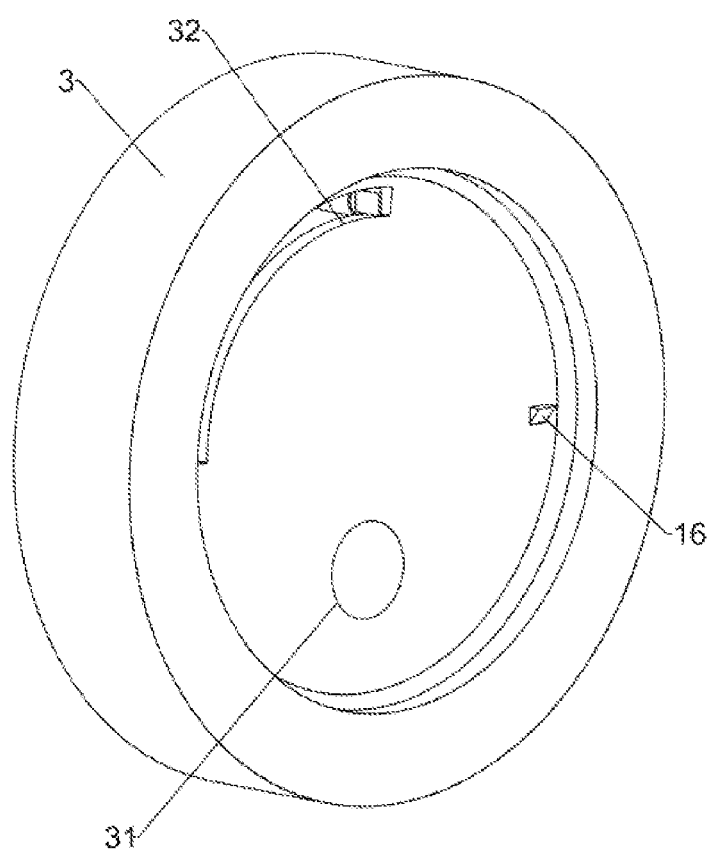
FIG. 2 is a schematic diagram of a three-dimensional structure of a heating frame according to the present disclosure.
Figure 3:
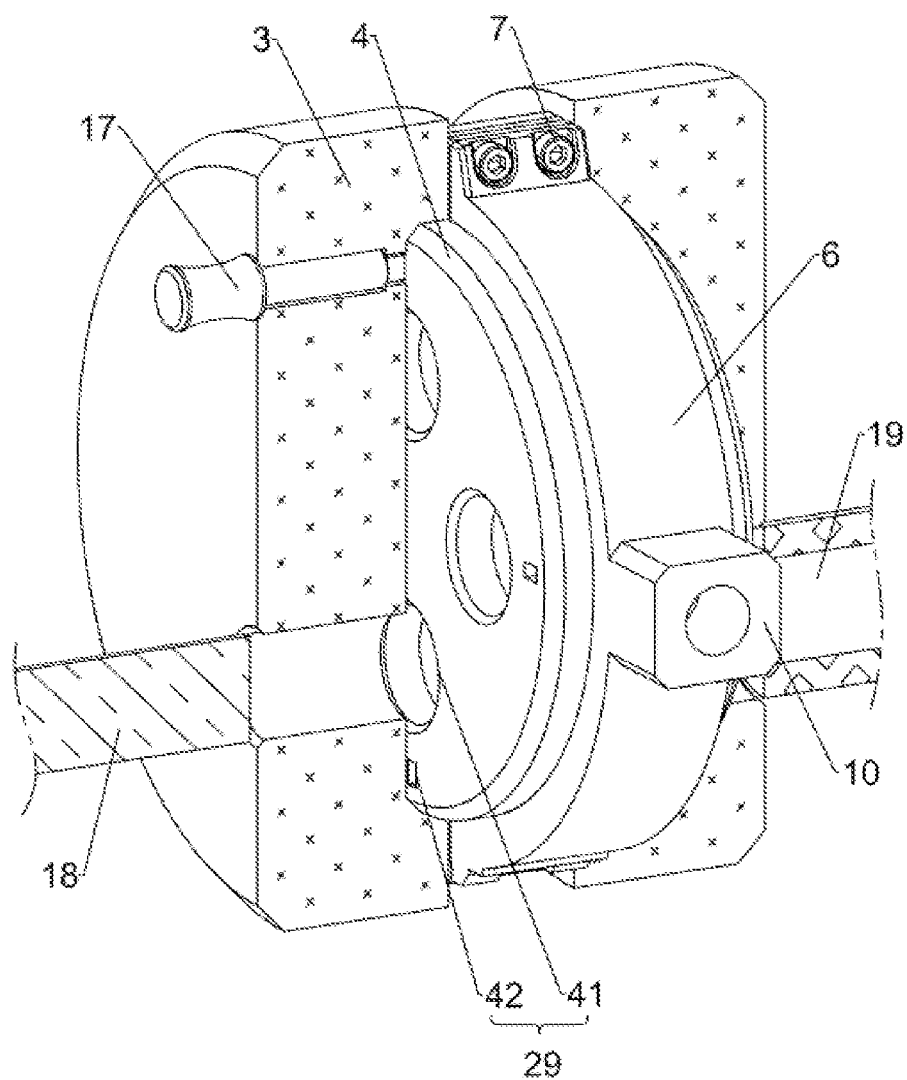
FIG. 3 is a sectional view of a three-dimensional structure of a sample holding unit according to the present disclosure.

On a basis of Embodiment 1, as shown in FIGS. 1 to 3, the sample holding unit 23 includes a heating frame 3. There are two heating frames 3, a left heating frame 3 is fixedly connected to a right end of the carriage 2 through a mounting frame 26, and a right heating frame 3 is fixedly connected to a right bearing frame 1 through a mounting frame 26. Lower parts of the two heating frames 3 are respectively provided with a limit hole 31, and the limit hole 31 is matched with the incident bar 18 and the transmission bar 19, which facilitates coaxial leveling. A limit rotating plate 4 is rotatably provided in the left heating frame 3, the limit rotating plate 4 is circumferentially provided with four first positioning holes 41. The first positioning holes 41 are configured to position the limit rotating plate 4 and facilitate a shearing test by the incident bar 18. A limit baffle 5 is fixedly mounted in the right heating frame 3, and the limit baffle 5 is provided with a second positioning hole 51. There are two fixed shells 6, and a rear fixed shell 6 is fixedly connected to the limit baffle 5. Lower ends of the two fixed shells 6 are hinged, and upper ends of the two fixed shells 6 are detachably connected by a fixing bolt 7. Both fixed shells 6 are located between the limit rotating plate 4 and the limit baffle 5, and a closed hydraulic cavity 27 is opened inside the two fixed shells 6. The hydraulic cavities 27 of the fixed shells 6 contain liquid 28 which changes little with influence of temperature, and a volume expansion coefficient of the liquid is less than 0.0009, so as to avoid change of a pressure environment after the test temperature environment is simulated. The upper and lower ends of the two fixed shells 6 are respectively provided with a rubber pad 9, the rubber pad 9 is configured for sealing between the two fixed shells 6 and assembling the cylindrical sample 8. With the rubber pad 9, there is more installation surplus when the two fixed shells 6 are fixedly matched. When there is a slight error in a diameter of the cylindrical sample 8, it is enough to offset the error by matching the rubber pads 9 of the two fixed shells 6.

Center points of the incident bar 18, the transmission bar 19, the limiting hole 31, a lower first positioning hole 41 and the second positioning hole 51 are in a same horizontal line, so that the incident bar 18 and the transmission bar 19 can be matched with the limiting hole 31 so as to accurately position a test position of the cylindrical sample 8. A left limiting hole 31 and first positioning hole 41 have a same diameter as the incident bar 18, and a right limiting hole 31 and second positioning hole 51 have a same diameter as the transmission bar 19, so as to avoid damage and splash of the cylindrical sample 8 in the test.

Figure 5:
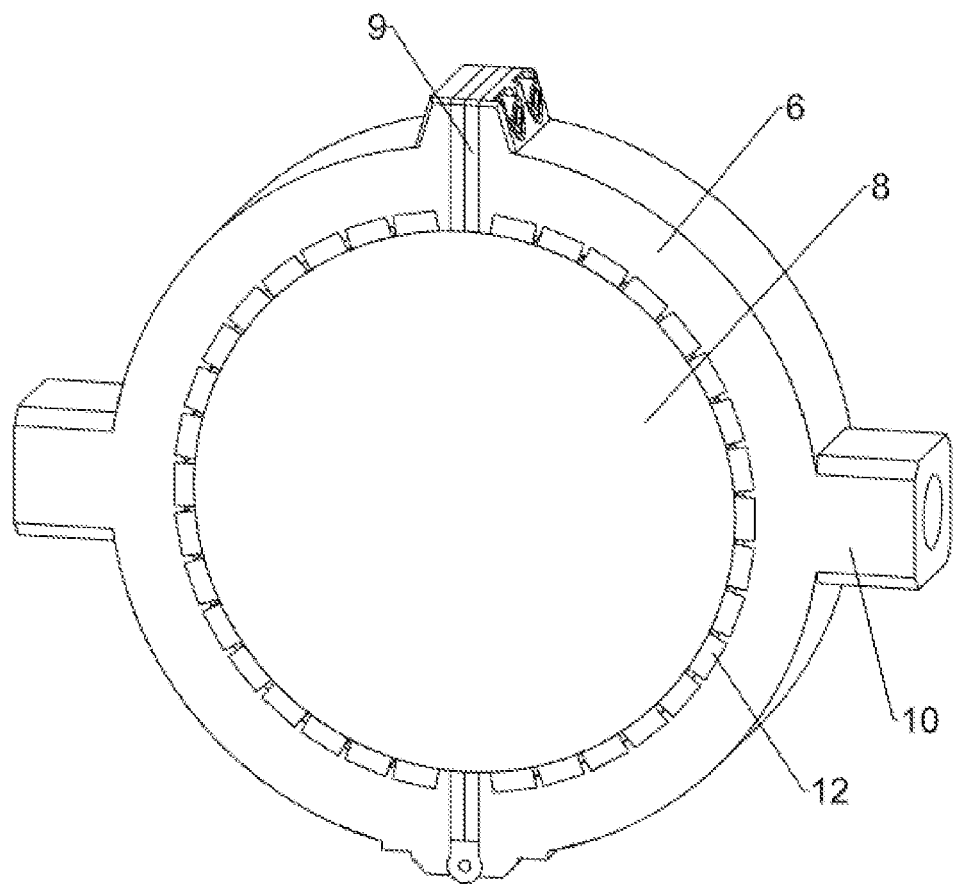
FIG. 5 is a schematic diagram of a three-dimensional structure of parts on a fixed shell according to the present disclosure.
Figure 6:
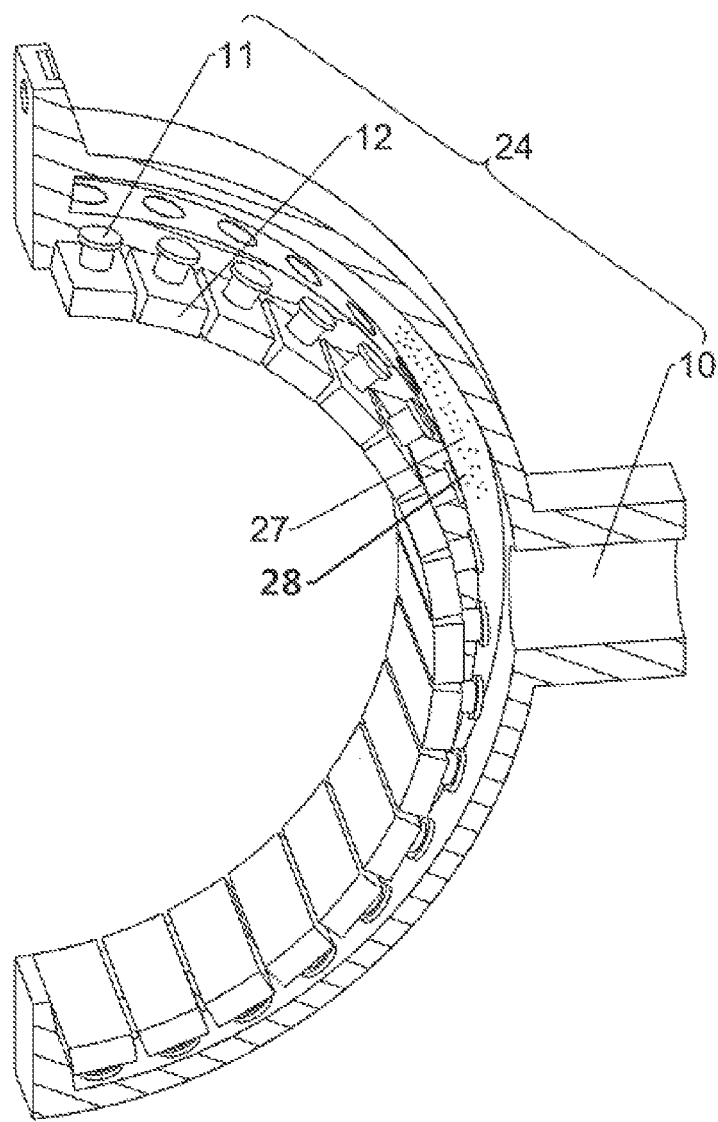
FIG. 6 is a sectional view of a three-dimensional structure of a fixed shell according to the present disclosure.

As shown in FIG. 5 and FIG. 6, the pressure environment generating unit 24 includes a hydraulic interface 10, and there are two hydraulic interfaces 10 which are respectively arranged at both sides of the fixed shell 6, and are connected with a hydraulic loading device 30 (such as a hydraulic pump and companion devices), and a hydraulic pressure generating machine is configured to provide a pressure for the liquid 28 in the hydraulic cavity 27 of the fixed shell 6 through the two hydraulic interfaces 10. A plurality of extrusion pistons 11 are circumferentially provided in the hydraulic cavity 27 of the fixed shell 6, and the plurality of extrusion pistons 11 are all slidably connected with an inner side wall of the fixed shell 6. The extrusion pistons 11 are communicated with the hydraulic cavity 27 of the fixed shell 6, and inner ends of two adjacent extrusion pistons 11 in a left-right direction are fixedly connected with an extrusion plate 12. An inner part of the extrusion plate 12 is made of a silicone material, and silicone can be deformed and has excellent characteristics such as low viscosity-temperature coefficient, high and low temperature resistance, oxidation resistance, etc., which still has excellent characteristics under a high temperature condition of the test in this disclosure and facilitates pressure applying and fixing of the cylindrical sample 8.

Figure 4:
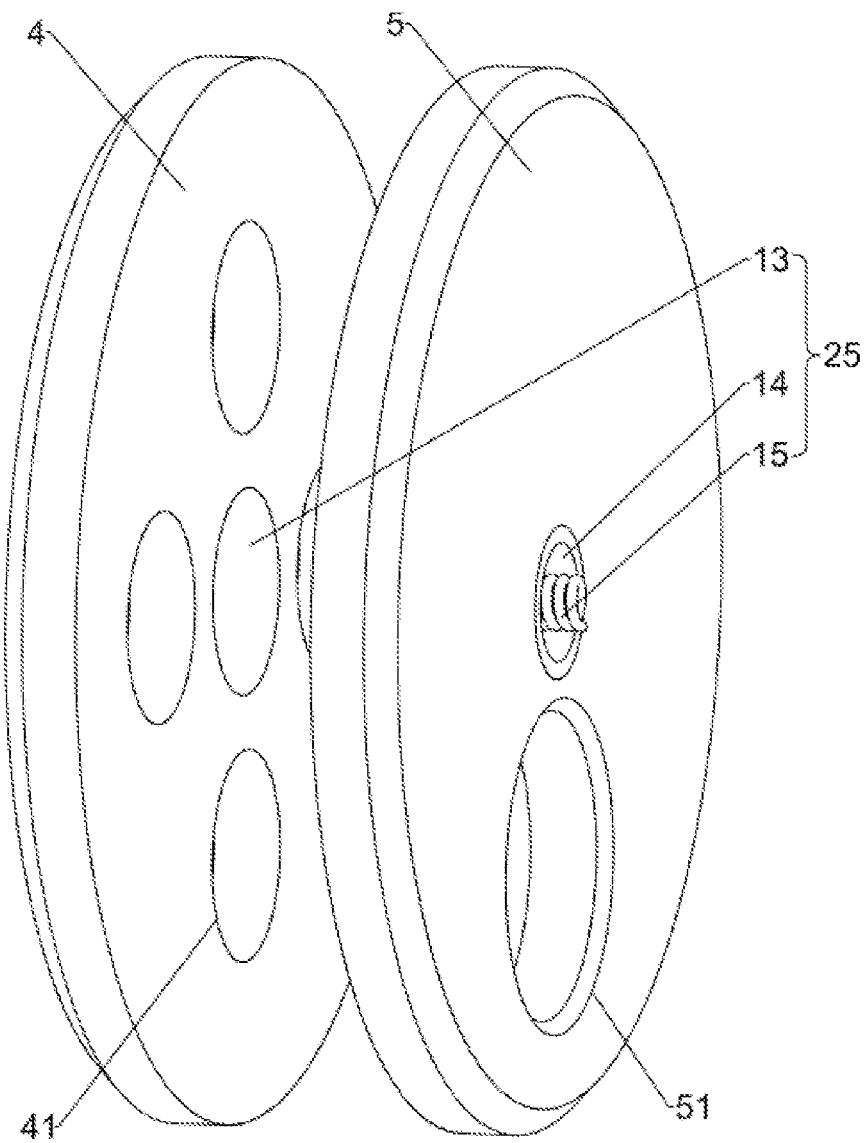
FIG. 4 is a schematic diagram of a three-dimensional structure of a limit rotating plate and a limit baffle according to the present disclosure.

As shown in FIG. 4, the sample switching unit 25 includes an extrusion block 13, the extrusion block 13 is fixedly mounted at a right side of the limit rotating plate 4, and an extrusion rotating block 14 is rotatably connected to a middle of the limit baffle 5. Side surfaces of the extrusion block 13 and the extrusion rotating block 14 that contact with the cylindrical sample 8 are set as rough surfaces with roughness Ra larger than 25 um, and the rough surfaces are used to increase contact friction between the cylindrical sample 8 and prevent the cylindrical sample 8 from sliding during rotation. An extrusion spring 15 is provided between the extrusion rotating block 14 and the right heating frame 3, and a thrust of the extrusion spring 15 always acts on the extrusion rotating block 14, so that the extrusion rotating block 14 is in close contact with the cylindrical sample 8, and an unidirectional rotating assembly 29 is provided between adjacent heating frames 3 and the limiting rotary plate 4, and the unidirectional rotating assembly 29 is configured to rotate the limit rotating plate 4 clockwise.

As shown in FIG. 2 and FIG. 3, the unidirectional rotating assembly 29 includes a spring limit block 16. The spring limit block 16 is slidably connected to a right side of the heating frame 3, a limit chute 32 is provided going through an upper part of the heating frame 3, and four slots 42 are circumferentially provided at a left side of the limit rotating plate 4. Two ends of the limit chute 32 are respectively matched with two slots 42 at an upper side and a front side, and the spring limit block 16 and the slots 42 are matched with each other in a counterclockwise and unidirectionally limiting manner. Under action of the spring limit block 16, the limit rotating plate 4 is prevented from rotating counterclockwise. A spring limit rod 17 is slidably provided in the limit chute 32 in a limited-sliding manner, and a right end of the spring limit rod 17 is configured for limiting of the limit rotating plate 4. The spring limit rod 17 is matched with the slot 42 in a clockwise and unidirectionally limiting manner, so that the limit rotating plate 4 cannot be rotated counterclockwise.

A temperature test environment for the cylindrical sample 8 is created by the heating frame 3, and meanwhile, the heating frame 3 functions in protecting and limiting the cylindrical sample 8, preventing the cylindrical sample 8 from being damaged, splashing or leaving a test area during the test, and the limit hole 31 facilitates leveling of the test device. Under action of the sample switching unit 25, the limit rotating plate 4 is matched with the cylindrical sample 8 to complete test position switching after each test. The limit rotating plate 4 and the limit baffle 5 function in limiting the cylindrical sample 8 during the test to prevent the cylindrical sample 8 from displacing. Under limiting of the fixed shells 6, the cylindrical sample 8 is centered and fixed, and an uniform pressure is applied to the cylindrical sample 8 with the liquid 28 in its internal hydraulic cavity 27 combined with the pressure environment generating unit 24, so as to simulate the pressure environment in which the cylindrical sample 8 is subjected to a shear force underground; meanwhile, heat transfer effect of the liquid 28 is weaker than that of solid, so with the liquid 28 in the fixed shells 6, there is better temperature maintenance effect on the test environment of the cylindrical sample 8.

When the hydraulic pressure generating machine operates to increase a pressure of the liquid 28 in the hydraulic cavity 27 of the fixed shell 6 through the hydraulic interface 10, the pressure of the liquid 28 uniformly applies a pressure to the extrusion plate 12 through the extrusion piston 11, and uniformly applies a pressure to an outer peripheral wall of the cylindrical sample 8 through the extrusion plate 12 circumferentially arranged. Meanwhile, the silicone material of an inner part of the extrusion plate 12 has a certain deformation, so that a contact area between the extrusion plate 12 and the cylindrical sample 8 under the pressure is increased. When there is no pressure, a small contact area does not affect rotation of the cylindrical sample 8, which is little affected by the temperature environment. With tight contact between the extrusion plate 12 and the cylindrical sample 8, the cylindrical sample 8 from rotating or displacing during the test also can be prevented.

Upon one shearing test is completed on the cylindrical sample 8, when the incident bar 18 and the transmission bar 19 are reset, the hydraulic pressure generating machine is turned off to stop applying the pressure to the cylindrical sample 8, and the threaded limit rod 21 is rotated to cause a left carriage 2 to drive parts thereon by a short distance to the left, so as to prevent the limit rotating plate 4 from being contacted with the fixed shell 6 too closely to rotate. After limiting of the cylindrical sample 8 in a left-right direction is released, the spring limit rod 17 is moved downward so as to drive the limit rotating plate 4 to rotate by 90 degrees clockwise, and the spring limit rod 17 is reset. When the spring limit rod 17 is reset, the spring limit block 16 prevents the limit rotating plate 4 from rotating counterclockwise. During rotation of the cylindrical sample 8, the extrusion spring 15 pushes the extrusion rotating block 14, so that the extrusion block 13 and the extrusion rotating block 14 always serve to clamp the cylindrical sample 8, and the rough surfaces of the extrusion block 13 and the extrusion rotating block 14 are closely attached to the cylindrical sample 8, increasing friction between the cylindrical sample 8 and the extrusion block and the extrusion rotating block so to prevent the cylindrical sample 8 from moving and affecting a test progress. After all of subsequent tests are completed, the cylindrical sample 8 is taken out of the fixed shell 6 and the device of this disclosure is disassembled and reset.

Embodiment 3

On a basis of Embodiment 2, a dynamic load shearing test method based on a hopkinson bar system includes following steps S1 to S6.

Test device assembly S1: firstly, a heating wire is mounted inside the heating frame 3, the extrusion block 13 and the limit rotating plate 4 are fixedly mounted, and after the extrusion rotating block 14 and the limit baffle 5 are rotatably mounted, the limit rotating plate 4 is rotatably mounted on the left heating frame 3, and the limit baffle 5 is fixedly mounted on the right heating frame 3, then the heating frame 3 is respectively bolted to the bearing frame 1 and the carriage 2 through the mounting frame 26, and finally the fixed shell 6 is fixedly mounted on the right heating frame 3.

Device leveling S2: the sample holding unit 23 is leveled by the sample switching unit 25, and the limit rotating plate 4 is rotated to cause a rear slot 42 to form limiting matching with the spring limit block 16, and the spring limit rod 17 is positioned at an uppermost end of the limit chute 32 for limiting with an upper slot 42. At this time, a first positioning hole 41 at a lowermost side is coaxial with a center of the left limit hole 31, and heights of the two heating frames 3 are adjusted so that centers of the limiting hole 31, the first positioning hole 41, the second positioning hole 51, the incident bar 18 and the transmission bar 19 are coaxial.

Pre-test preparation S3: the fixing bolt 7 is loosened and the front fixing shell 6 is opened, the cylindrical sample 8 is placed between the two fixing shells 6, the fixing shells 6 are closed and the fixing bolt 7 is tightened, the threaded limit rod 21 is rotated to cause the left carriage 2 to drive parts thereon to move to the right until a right end of the carriage 2 contacts the positioning rod 22, and at this time fixing of the cylindrical sample 8 in a left-right direction can be completed. Then, a pressure generating machine is started to simulate a pressure environment of the cylindrical sample 8 through the hydraulic interface 10, and then to simulate a temperature environment of the cylindrical sample 8 by a heating member in the heating frame 3.

Test conducting S4: after the incident bar 18 and the transmission bar 19 are attached to the cylindrical sample 8 to complete test preparation, a stress wave is applied to the incident bar 18 through a trigger device of the split hopkinson bar dynamic test system, and the incident bar 18 transmits emission waves of the split hopkinson bar dynamic test system, the incident bar 18 receives reflection waves, and the transmission bar 19 receives respective transmission waves, and respective wave data are calculated and counted by the split hopkinson bar dynamic test system to obtain dynamic mechanical performance data of the cylindrical sample 8.

Sample angle switching S5: after one test, fixation of the cylindrical sample 8 is loosened through the threaded limit rod 21, the cylindrical sample 8 is rotated by 90 degrees through the spring limit rod 17 being matched with the limit rotating plate 4, and then the cylindrical sample 8 is fixed again and a next test is conducted until four tests are completed.

Test device resetting S6: after all of the tests are completed, the left and right heating frames 3 are spaced apart away by the threaded limit rod 21, and then the limit rotating plate 4 and the limit baffle 5 are removed and reset from rear to front according to a mounting sequence in step S1.

In the present disclosure, terms "first" and "second" are only configured for descriptive purposes and cannot be understood as indicating or implying relative importance. A term "plural" refers to two or more, unless otherwise explicitly defined. Terms such as "mounting", "coupling", "connecting" and "fixing" should be understood in a broad sense. For example, "connecting" can be "fixedly connecting", or "detachably connecting" or "integrally connecting", and "coupling" can be "directly coupling" or "indirectly coupling through an intermediate medium". For a person of ordinary skill in the art, specific meanings of the above terms in the present disclosure can be understood according to specific situations.

In the description of the present disclosure, it should be understood that the terms "upper", "lower", "left", "right", "front" and "rear" which indicate an orientation or positional relationship are based on the orientation or positional relationship shown in the drawings, and are merely for convenience of describing the present disclosure and simplifying the description, rather than indicate or imply that the device or unit referred to must have a specific direction, be configured and operated in a specific orientation, and thus cannot be understood as a limitation on the present disclosure.

Specific embodiments described above are intended for further explaining objects, technical schemes and beneficial effects of the present disclosure in detail. It should be understood that the above are only specific embodiments of the present disclosure and are not used to limit the present disclosure. Any modification, equivalent substitution, improvement, etc. made within the spirit and principle of this disclosure shall be encompassed within the protection scope of this disclosure.

What is claimed is:

1. A dynamic load shearing test device based on a hopkinson bar system, comprising a bearing frame, wherein a carriage is provided at a left side of the bearing frame, a sample holding unit is provided on the carriage and the bearing frame, the sample holding unit is configured to position and fix a cylindrical sample, a pressure environment generating unit is provided in the sample holding unit, the sample holding unit and the pressure environment generating unit are configured to simulate an underground environment of a rock, and a sample switching unit is provided at a left part of the sample holding unit; the sample switching unit is configured to switch a shearing position of the cylindrical sample; an incident bar is provided at a left side of the sample holding unit, and a transmission bar is provided at a right side of the sample holding unit, both the incident bar and the transmission bar belong to a split hopkinson bar dynamic test system, and there are two fixed frames; the carriage and the bearing frame are respectively fixedly connected with a fixed frame, and a threaded limit rod is provided between the two fixed frames in a throughgoing manner, and the right bearing frame is fixedly connected with two positioning rods;

the sample holding unit comprises a heating frame and there are two heating frames, wherein a left heating frame is fixedly connected to a right end of the carriage through a mounting frame, and a right heating frame is fixedly connected to a right bearing frame through a mounting frame; lower parts of the two heating frames are respectively provided with a limit hole, and the limit hole is matched with the incident bar and the transmission bar, which facilitates coaxial leveling; a limit rotating plate is rotatably provided in the left heating frame, the limit rotating plate is circumferentially provided with a plurality of first positioning holes, the plurality of first positioning holes are configured to position the limit rotating plate and facilitate a shearing test by the incident bar; a limit baffle is fixedly mounted in the right heating frame, and the limit baffle is provided with a second positioning hole; there are two fixed shells, and a rear fixed shell is fixedly connected to the limit baffle, lower ends of the two fixed shells are hinged, and upper ends of the two fixed shells are detachably connected by a fixing bolt, both fixed shells are located between the limit rotating plate and the limit baffle, and a closed hydraulic cavity is opened inside the two fixed shells; the hydraulic cavities of the fixed shells contain liquid which changes little with influence of temperature, the sample switching unit comprises an extrusion block, wherein the extrusion block is fixedly provided at a right side of the limit rotating plate, and an extrusion rotating block is rotatably connected to a middle of the limit baffle; side surfaces of the extrusion block and the extrusion rotating block that contact with the cylindrical sample are set as rough surfaces for preventing the cylindrical sample from sliding during rotation; an extrusion spring is provided between the extrusion rotating block and the right heating frame, and a thrust of the extrusion spring always acts on the extrusion rotating block, so that the extrusion rotating block is in contact with the cylindrical sample, and an unidirectional rotating assembly is provided between adjacent heating frames and the limiting rotary plate, and the unidirectional rotating assembly is configured to rotate the limit rotating plate clockwise, and the unidirectional rotating assembly comprises a spring limit block, wherein the spring limit block is slidably provided at a right side of the heating frame, a limit chute is provided going through an upper part of the heating frame, and four slots are circumferentially provided at a left side of the limit rotating plate; two ends of the limit chute are respectively matched with two slots at an upper side and a front side, and the spring limit block and the slots are matched with each other in a counterclockwise and unidirectionally limiting manner; under action of the spring limit block, the limit rotating plate is prevented from rotating counterclockwise, a spring limit rod is slidably provided in the limit chute in a limited-sliding manner, and a right end of the spring limit rod is configured for limiting of the limit rotating plate; the spring limit rod is matched with the slot in a clockwise and unidirectionally limiting manner.

2. The dynamic load shearing test device based on hopkinson bar system according to claim 1, wherein center points of the incident bar, the transmission bar, the limiting hole, a lower first positioning hole and the second positioning hole are in a same horizontal line; and a left limiting hole and first positioning hole have a same diameter as the incident bar, and a right limiting hole and second positioning hole have a same diameter as the transmission bar.

3. The dynamic load shearing test device based on hopkinson bar system according to claim 1, wherein the upper and lower ends of the two fixed shells are respectively provided with a rubber pad, the rubber pad being configured for sealing between the two fixed shells and assembling the cylindrical sample.

4. The dynamic load shearing test device based on hopkinson bar system according to claim 1, wherein the pressure environment generating unit comprises a hydraulic interface, and there are two hydraulic interfaces which are respectively arranged on the two fixed shells, and are connected with a hydraulic loading device; a plurality of extrusion piston are circumferentially provided in a hydraulic cavity of each of the fixed shells, and the plurality of extrusion pistons are all slidably connected with an inner side wall of the fixed shell; and the plurality of extrusion pistons are communicated with the hydraulic cavity of the fixed shell, and inner ends of two adjacent extrusion pistons in a left-right direction are fixedly connected with an extrusion plate.

5. The dynamic load shearing test device based on hopkinson bar system according to claim 4, wherein an inner part of the extrusion plate is made of a silicone material.

6. The dynamic load shearing test device based on hopkinson bar system according to claim 1, wherein side surfaces of the extrusion block and the extrusion rotating block in contact with the cylindrical sample are set as rough surfaces.

7. A dynamic load shearing test method based on a hopkinson bar system for the dynamic load shearing test device based on the hopkinson bar system according to claim 1, comprising:

test device assembly S1, in which after completing mounting of a heating member inside the heating frame, mounting of the extrusion block and the limit rotating plate, and mounting of the extrusion rotating block and the limit baffle, the limit rotating plate is rotatably mounted on the left heating frame, and the limit baffle is fixedly mounted on the right heating frame, the heating frame is respectively mounted on the bearing frame and the carriage through the mounting frame, and the fixed shell is fixedly mounted on the right heating frame;

device leveling S2, in which the sample holding unit is leveled by the sample switching unit, and the limit rotating plate is rotated to cause a rear slot to form limiting matching with the spring limit block, and the spring limit rod is positioned at an uppermost end of the limit chute for limiting with an upper slot; at this time, a first positioning hole at a lowermost side is coaxial with a center of the left limit hole, and heights of the two heating frames are adjusted so that centers of the limiting hole, the first positioning hole, the second positioning hole, the incident bar and the transmission bar are coaxial;

pre-test preparation S3, in which the fixing bolt is loosened and the front fixing shell is opened, the cylindrical sample is placed between the two fixing shells, the fixing shells are closed and the fixing bolt is tightened, the threaded limit rod is rotated to cause the left carriage to drive parts thereon to move to the right until a right end of the carriage contacts the positioning rod, and at this time fixing of the cylindrical sample in a left-right direction is completed; then, the hydraulic interface is started to simulate a pressure environment of the cylindrical sample, and then to simulate a temperature environment of the cylindrical sample by the heating member in the heating frame;

test conducting S4, in which the incident bar transmits emission waves of a split hopkinson bar dynamic test system, the incident bar receives reflection waves, and the transmission bar receives respective transmission waves, and respective wave data are calculated and counted by the split hopkinson bar dynamic test system to obtain dynamic mechanical performance data of the cylindrical sample;

sample angle switching S5, in which after one test, fixation of the cylindrical sample is loosened through the threaded limit rod, the cylindrical sample is rotated through the spring limit rod being matched with the limit rotating plate, and then the cylindrical sample is fixed again and a next test is conducted until multiple tests are completed; and test device resetting S6, in which after all of the tests are completed, the left and right heating frames are spaced apart away by the threaded limit rod, and then the limit rotating plate and the limit baffle are removed and reset from rear to front according to a mounting sequence in step S1.

* * * * *